(12) United States Patent
Suzuki et al.

(10) Patent No.: US 8,005,107 B2
(45) Date of Patent: Aug. 23, 2011

(54) METHOD AND SYSTEM FOR ROBUST MAC SIGNALING

(75) Inventors: Takashi Suzuki, Ichikawa (JP); James Earl Womack, Bedford, TX (US); Gordon Peter Young, Shipston-on-Stour (GB)

(73) Assignee: Research In Motion Limited, Ontario (CA)

( * ) Notice: Subject to any disclaimer, the term of this patent is extended or adjusted under 35 U.S.C. 154(b) by 693 days.

(21) Appl. No.: 11/671,800

(22) Filed: Feb. 6, 2007

(65) Prior Publication Data

US 2008/0186944 A1    Aug. 7, 2008

(51) Int. Cl.
- H04L 12/28    (2006.01)
- H04L 12/26    (2006.01)
- H04W 4/00    (2009.01)
- H04J 3/24    (2006.01)

(52) U.S. Cl. ........ 370/431; 370/341; 370/349; 370/231; 370/329; 370/333

(58) Field of Classification Search .................. 370/349, 370/348, 310, 310.1, 312, 322, 328, 329, 370/333, 335, 341, 343, 342, 431, 441, 468, 370/231, 236, 394; 455/450, 451, 452.1, 455/452.2; 714/15, 18, 20, 48
See application file for complete search history.

(56) References Cited

U.S. PATENT DOCUMENTS

| | | | |
|---|---|---|---|
| 6,981,048 B1 | 12/2005 | Abdolbaghian et al. | |
| 7,116,651 B2 | 10/2006 | Hakkinen et al. | |
| 2003/0169704 A1 | 9/2003 | Okanoue | |
| 2003/0210669 A1 | 11/2003 | Vayanos et al. | |
| 2005/0073987 A1* | 4/2005 | Wu | 370/349 |
| 2006/0020707 A1 | 1/2006 | Undery et al. | |
| 2008/0026741 A1* | 1/2008 | Nakamata et al. | 455/420 |
| 2008/0043619 A1* | 2/2008 | Sammour et al. | 370/231 |
| 2008/0101285 A1* | 5/2008 | Venkatachalam et al. | 370/329 |
| 2008/0310338 A1* | 12/2008 | Charpenter et al. | 370/315 |
| 2009/0164862 A1* | 6/2009 | Sagfors et al. | 714/748 |

FOREIGN PATENT DOCUMENTS

| | | |
|---|---|---|
| EP | 1 569 404 A1 | 8/2005 |
| WO | 2005/034418 A1 | 4/2005 |
| WO | 2005/093985 A1 | 10/2005 |
| WO | 2005/115021 A2 | 12/2005 |
| WO | 2006/109125 A2 | 10/2006 |

OTHER PUBLICATIONS

SHRCWC, "An efficient and robust HARQ-ARQ Interaction Scheme," 3GPP TSG-RAN WG2 Meeting #55, Seoul, Korea, Oct. 9-13, 2006, R2-062783 (XP-002429964).

Nokia, "Active mode DRX details," 3GPP TSG-RAN WG2 Meeting #56, Riga, Latvia, Nov. 6-10, 2006, R2-063081 (XP-002429962).

(Continued)

*Primary Examiner* — Jinsong Hu
*Assistant Examiner* — Mong-Thuy Tran
(74) *Attorney, Agent, or Firm* — Hamilton & Terrile, LLP

(57) ABSTRACT

A method for indicating and interpreting robust MAC signaling, the indicating method having the steps of: checking whether a MAC-PDU contains control information; and if yes, providing an indication to use a robust configuration for a HARQ feedback transmission, and the interpreting method having the steps of: receiving a MAC-PDU; checking whether an indication for robust HARQ feedback transmission is provided; and if yes, utilizing robust HARQ feedback transmission.

20 Claims, 12 Drawing Sheets

OTHER PUBLICATIONS

Itri, "An efficient and robust HARQ-ARQ Interaction," 3GPP TSG-RAN2 Meeting #53, Shanghai, China, May 8-12, 2005, R2-061244 (XP-002429963).

Ericsson, "HARQ-ARQ Interactions," 3GPP TSG-RAN WG2 #53, Shaghai, China, May 8-12, 2006, R2-061398 (XP-002429961).

Ericsson, "Outer ARQ and HARQ," 3GPP TSG-RAN WG2 #52, Athens, Greece, Mar. 27-31, 2006, R2-060971 (XP-002429965).

EP 07102272.7, Extended Search Report dated May 8, 2007.

EP 07102272.7, Examination Report dated Nov. 14, 2007.

EP 07102272.7, Examination Report dated Aug. 4, 2008.

* cited by examiner

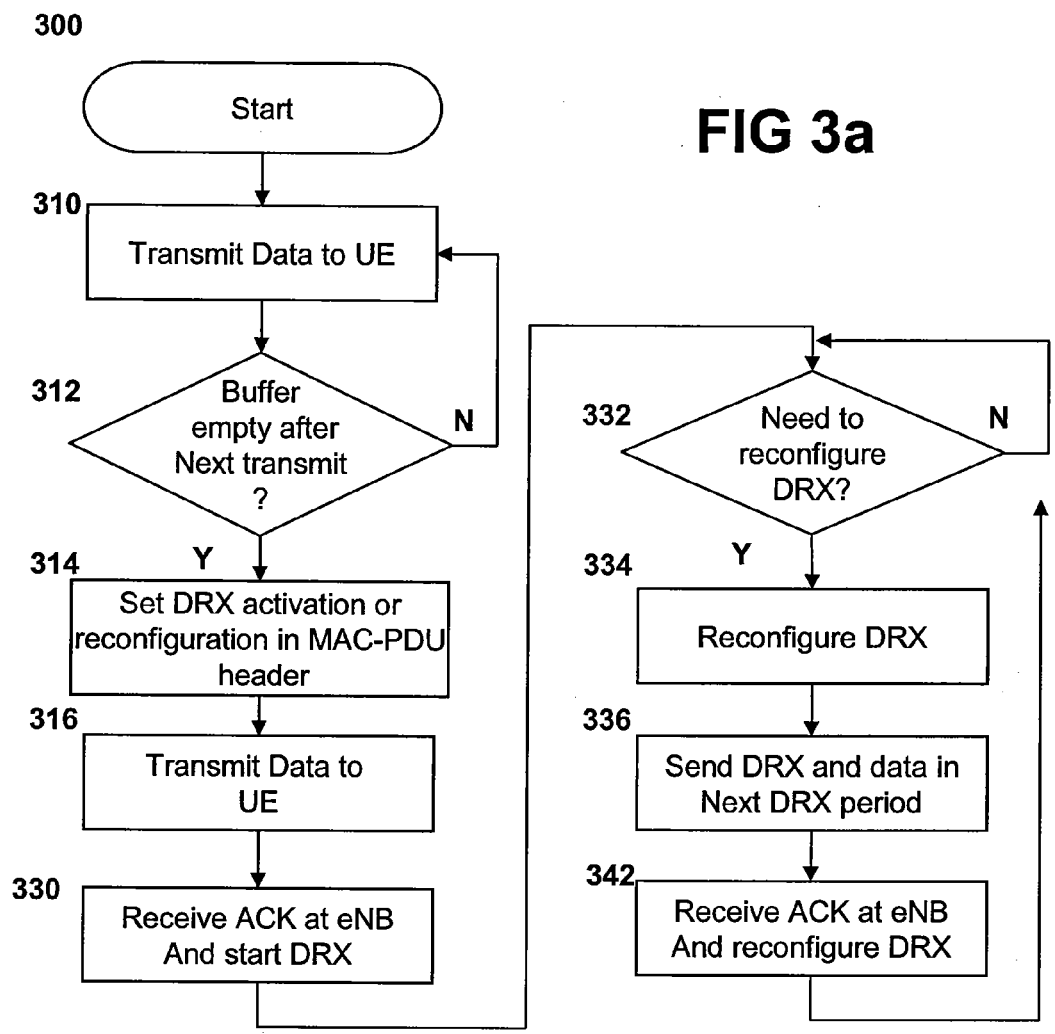

20 US 8,005,107 B2

METHOD AND SYSTEM FOR ROBUST MAC SIGNALING

FIELD OF THE DISCLOSURE

The present disclosure relates to the long term evolution (LTE) of Third Generation Partnership Project (3GPP), and in particular to HARQ feedback transmission from user equipment (UE) in the LTE infrastructure.

BACKGROUND

In the long term evolution infrastructure, one proposal being studied is the use of control information in the MAC-PDU header. This can be used, for example, with discontinuous reception (DRX) of user equipment in an LTE_Active state. The 3GPP TSG-RAN Working Group 2 proposal R2-063081 proposes that regular DRX configuration be signaled by radio resource control (RRC) protocol and that temporary DRX configuration is signaled by Medium Access Control (MAC) signaling.

A problem with the sending of control information in the MAC-PDU header is due to HARQ feedback errors. In particular, when the enhanced Node B (eNB) misinterprets a NACK as an ACK for the downlink MAC data. In particular, with in band DRX parameters which configure a shorter DRX value than that of the already assigned DRX, the UE would miss subsequent downlink MAC data as sent from the eNB.

BRIEF DESCRIPTION OF THE DRAWINGS

The present application will be better understood with reference to the drawings, in which:

FIG. 3a is a flow chart showing a method to activate, deactivate and reconfigure DRX period using a MAC-PDU header from the eNB side;

DETAILED DESCRIPTION OF THE DRAWINGS

Figure 1:
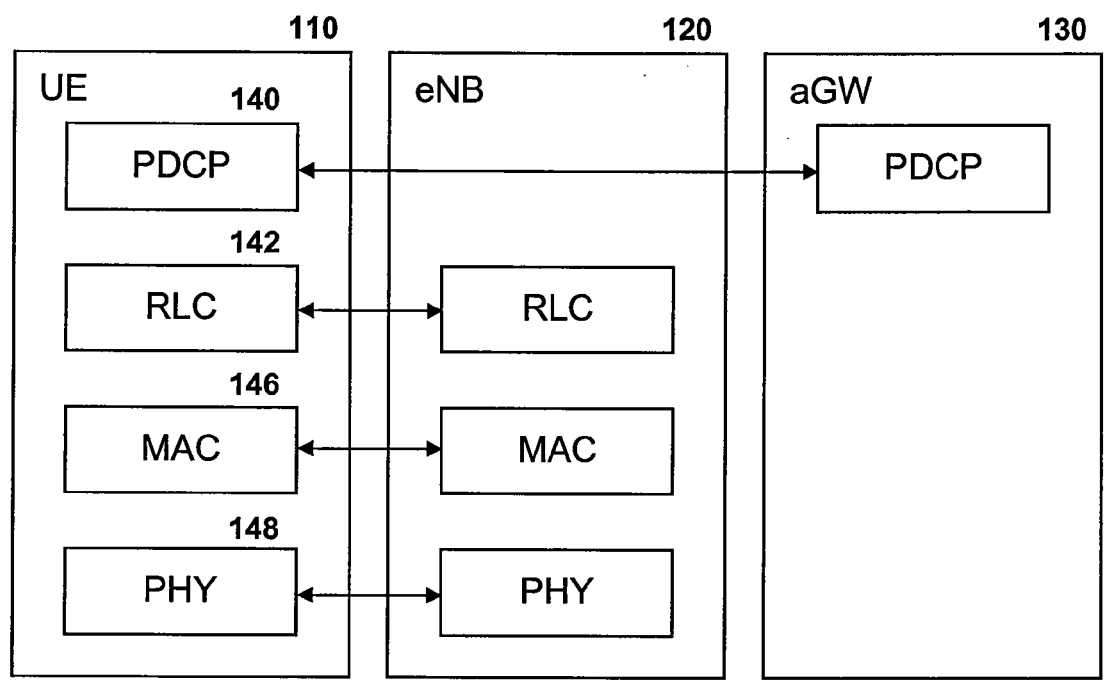
FIG. 1 is a block diagram showing a long term evolution user plane protocol stack.

The present disclosure provides various methods and systems for addressing the deficiencies and the prior art regarding HARQ feedback transmission.

In particular, the present system and method provides for a more robust and reliable HARQ feedback transmission in the case of control information being sent in the MAC-PDU. The method and system of the present disclosure includes signaling by the RRC of a configuration for UE HARQ feedback transmission for a normal MAC-PDU and a robust configuration for UE HARQ feedback transmission for a MAC-PDU which contains control information. The method and system further provide for the eNB indicating, when a MAC-PDU is transmitted, if the UE should use standard or robust configuration for HARQ feedback transmission.

Four potential methods for indication between the eNB and the UE are outlined. These include the use of a reserved downlink shared control channel where the sending of a MAC-PDU is signaled on a reserved DLSCCH, specifically if there is control information in the MAC-PDU being sent on the downlink shared data channel and otherwise the sending of the MAC-PDU is signaled on a different DLSCCH.

A further indication method is the use of a one-bit indication on the DLSCCH. Specifically, the one-bit indication could be set to indicate whether the UE should use standard or robust configuration for HARQ feedback transmission when it sends an ACK or a NACK after receiving the associated MAC-PDU on the downlink shared channel associated with the DLSCCH.

A third indication method is the use of two radio network terminal identifiers (RNTIs). The UE is configured by the RRC with two RNTIs. One RNTI is used for MAC-PDUs with control information in the header to signify robust HARQ and the second RNTI is used for MAC-PDUs without control information in the header to signify normal HARQ. Thus the UE knows whether to use a more robust HARQ feedback transmission or not.

A fourth method for indication is to use a repetition field in the MAC-PDU header itself. The repetition field would be used to indicate that the HARQ feedback transmission should occur several times, where the number times that the HARQ feedback transmission should be sent is specified in the repetition field. The eNB could then monitor the received acknowledgements in order to determine the reliability of the UE signaling, e.g. whether more ACKs were received than NACKs or DTXs.

The present disclosure therefore provides a method for indicating robust Medium Access Control (MAC) signaling comprising the steps of: checking whether a MAC protocol data unit (MAC-PDU) contains control information; and if yes, providing an indication to use a robust configuration for a hybrid automatic repeat request (HARQ) feedback transmission.

The present disclosure further provides a method for interpreting an indication of robust Medium Access Control (MAC) signaling comprising the steps of: receiving a MAC protocol data unit (MAC-PDU); checking whether an indication for robust hybrid automatic repeat request (HARQ) feedback transmission is provided; and if yes, utilizing robust hybrid automatic repeat request (HARQ) feedback transmission.

The present disclosure further provides an enhanced Node B (eNB) adapted to indicate robust Medium Access Control (MAC) signaling, characterized by: means for checking whether a MAC protocol data unit (MAC-PDU) contains control information; and means for providing an indication to use a robust configuration for a hybrid automatic repeat request (HARQ) feedback transmission.

The present disclosure still further provides a User Equipment (UE) adapted to interpret an indication of robust Medium Access Control (MAC) signaling, characterized by: means for receiving a MAC protocol data unit (MAC-PDU); means for checking whether an indication for robust hybrid automatic repeat request (HARQ) feedback transmission is provided; and means for utilizing robust hybrid automatic repeat request (HARQ) feedback transmission.

Reference is now made to the drawings. FIG. 1 shows a block diagram illustrating the long-term evolution (LTE) user plane protocol stack.

A UE 110 communicates with both an evolved Node B (eNB) 120 and an access gateway (aGW) 130.

Various layers are illustrated in the protocol stack. The packet data convergence protocol (PDCP) layer 140 is illustrated both on the UE 110 and on aGW 130. The PDCP layer 140 performs internet protocol (IP) header compression and decompression, encryption of user data, transfer of user data and maintenance of sequence numbers (SN) for radio bearers.

Below the PDCP layer 140 is the radio link control protocol layer 142, which communicates with the radio link control protocol layer 142 on the eNB 120. As will be appreciated, communication occurs through the physical layer in protocol stacks such as those illustrated in FIGS. 1 and 2. However, RLC-PDUs from the RLC layer 142 of the UE are interpreted by the RLC layer 142 on the eNB 120.

Below RLC layer 142 is the medium access control (MAC) data communication protocol layer 146. As will be appreciated by those skilled in the art, the RLC and MAC protocols form the data link sublayers of the LTE radio interface and reside on the eNB in LTE and user equipment.

The layer 1 (L1) LTE (physical layer 148) is below the RLC/MAC layers 144 and 146. This layer is the physical layer for communications.

Figure 2:
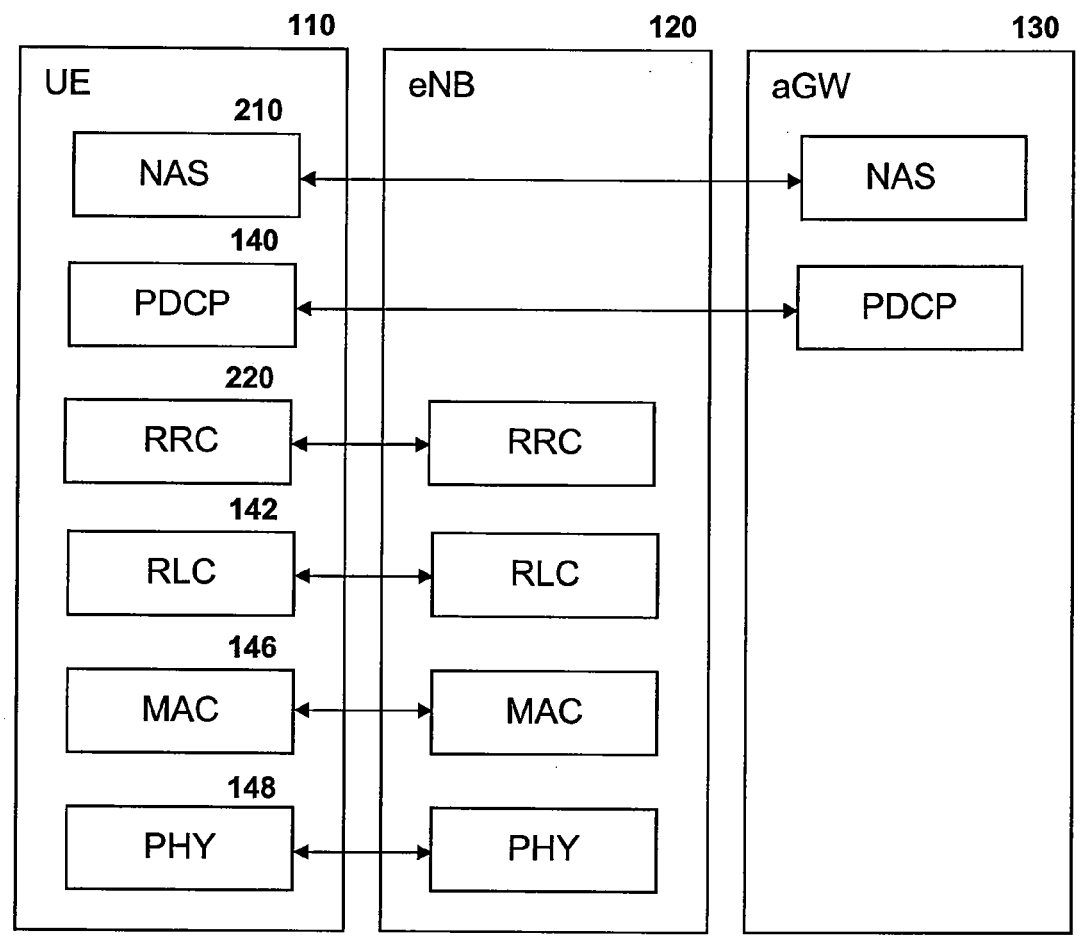
FIG. 2 is a block diagram showing a long term evolution control plane protocol architecture.

Referring to FIG. 2, FIG. 2 illustrates the LTE control plane protocol architecture. Similar reference numerals to those used in FIG. 1 will be used in FIG. 2. Specifically, UE 110 communicates with eNB 120 and aGW 130. Further, physical layer 148, MAC layer 146, RLC layer 142 and PDCP layer 140 exist within FIG. 2.

FIG. 2 also shows the non-access stratum (NAS) layer 210. As will be appreciated, NAS layer 210 could include mobility management and session management.

The radio resource control protocol layer (RRC) 220, is the part of the protocol stack that is responsible for the assignment, configuration and release of radio resources between the UE and the E-UTRAN (Evolved universal terrestrial radio access network). The basic functionalities of RRC protocol for LTE is described in 3GPP TR25.813.

As will be appreciated by those skilled in the art, in UMTS, automatic repeat request (ARQ) functionality is carried out within the RLC layer which resides in the radio network controller (RNC). Long Term Evolution (LTE) moves the ARQ functionality from the RNC to eNB where a tighter interaction may exist between the ARQ and the HARQ (within the MAC layer, also located in the eNB).

Various issues regarding DRX in an LTE-ACTIVE state are considered herein.
DRX Signaling Procedure Very efficient signaling procedures for activating and de-activating DRX and specifying the duration of DRX periods are required in order to support a large population of UEs in a cell that are utilizing DRX in an LTE_ACTIVE state.

As will be appreciated by those skilled in the art, if the evolved Node B (eNB) transmits data to the UE during its receiver off period due to a DRX operation, the UE cannot receive the data. Therefore, special effort is required to ensure the UE and the eNB are synchronized regarding when DRX is activated and deactivated.

The indication between the UE and the eNB can be explicit signaling by the radio resource control (RRC) or layer 1/layer 2 (L1/L2) signaling. As will be appreciated, however, explicit signaling may not be as efficient as desired.

A more efficient solution is to include an optional field in the MAC header of a MAC-PDU (MAC Protocol Data Unit) to indicate DRX activation and deactivation. The field preferably indicates the DRX value and timing margin for activation and deactivation. A value of zero, for example, could mean DRX deactivation in the DRX value field in a preferred embodiment. Conversely, if data that is to be transmitted in the next MAC-PDU is the last one in the buffer for the UE, the eNB may extend the MAC header field to include a DRX length initial value. For example, this could be 320 milliseconds.

The timing margin is explained below, and is utilized to reduce the consequences of a NACK to ACK or ACK to NACK misinterpretation, for the reception status of the MAC-PDU between the UE and the eNB.

Several different methods for signaling the DRX period within the MAC-PDU header can be envisaged. For example, three bits may be added to the MAC header to indicate eight values of the DRX period. Thus, rather than a specific time value being sent, a bit value from 000 to 111 could indicate one of eight discrete values.

In an alternative, a smaller field in the MAC header could be used (for example two bits) to indicate increment or decrement. The RRC could indicate default values, and if the MAC header indicates increment or decrement then the UE could change to the pre-specified value, according to the received indication. Similarly, the RRC could define the mapping between the actual DRX value and the value contained in the smaller field.

Once the UE receives the DRX value, it acknowledges it to the eNB by transmitting HARQ ACK and starts the DRX at the appropriate system frame considering propagation delay and processing delay at the eNB. When the eNB receives the ACK from the UE, it also starts the DRX at the appropriate system frame time. As will be appreciated, the eNB does not turn off its transceiver, but simply knows not to transmit messages to the individual UE.

During the awake cycle of a DRX period, if new data has arrived at the eNB for transmission, the eNB can send a MAC-PDU with a header extension set to DRX deactivation or a shorter DRX length depending on the amount of data in the buffer or the quality of service requirements. The UE reconfigures the DRX accordingly and acknowledges the MAC-PDU. When the eNB receives the ACK, it reconfigures the DRX. As indicated above, the deactivation could be accomplished by merely setting the length value to zero.

Figure 3B:
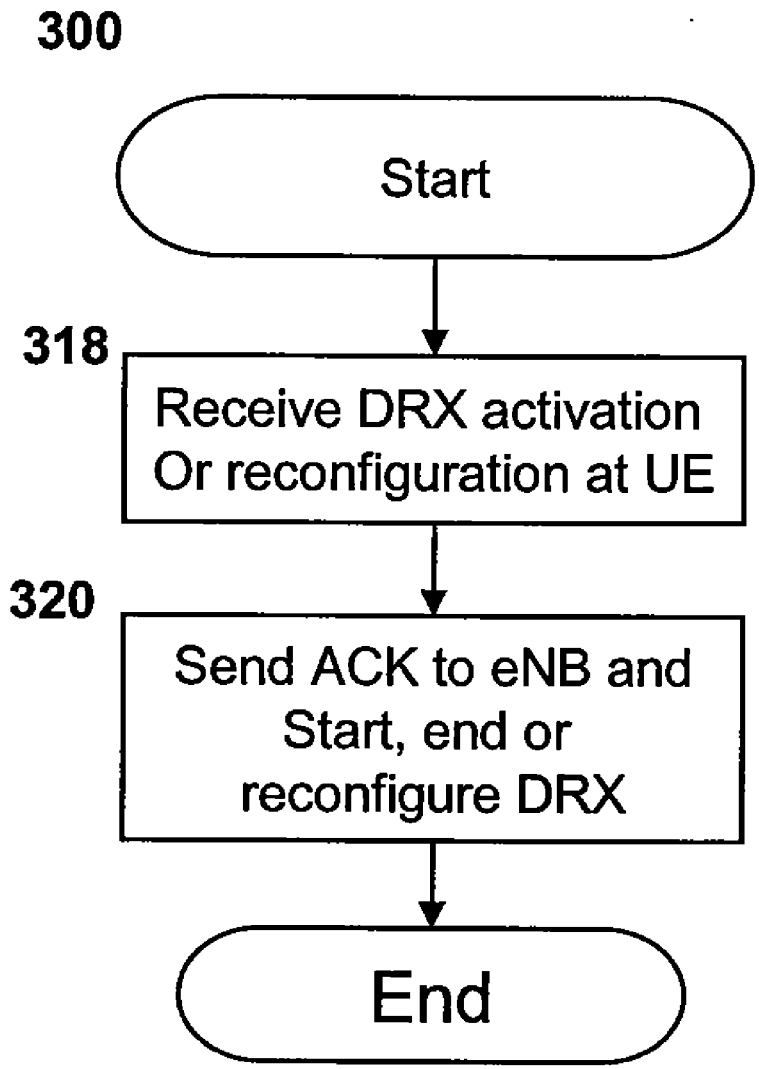
FIG. 3b is a flow chart showing a method to acknowledge the activation, deactivation or reconfiguration of the DRX period from the UE side.

Reference is now made to FIG. 3a and 3b. FIG. 3a shows an exemplary method for controlling DRX activation in the LTE_ACTIVE state. The process starts at step 300 and proceeds to step 310 in which data is transmitted to the UE. As will be appreciated by those skilled in the art, data transmission in the LTE_ACTIVE state utilizes the MAC-PDU at the data link layer to transmit the data.

The process next proceeds to step 312 in which a check is made to see whether the buffer of data to be sent to the UE will be empty after the next transmit. If no, the process proceeds back to step 310 in which data is transmitted to the UE.

Alternatively, if the buffer will be empty after the next transmit and the data arrival rate is lower than a threshold value, the process proceeds to step 314.

In step 314, the eNB sets DRX activation in the MAC-PDU header. As indicated above, this includes a DRX activation value indicating the length of the DRX period. In another embodiment the eNB may simply indicate an increase in the DRX interval. The UE reconfigures the existing DRX interval to a predetermined reduced interval. The predetermined interval may be either known to both eNB and UE or pre-signaled to the UE from the eNB via explicit signaling; either by system broadcast or RRC signaling.

The process then proceeds to step 316 in which the data including the modified MAC-PDU header is sent to the UE.

Reference is now made to FIG. 3b. In step 318, the UE receives the data and sees that DRX activation is specified in the MAC-PDU header. The process proceeds to step 320 in which the UE sends an acknowledgement (ACK) to the eNB and starts the DRX at the appropriate system frame considering propagation delay and processing delay at the eNB.

In step 330 of FIG. 3a, the eNB receives the ACK from the UE and starts the DRX at the next system frame.

As will be appreciated, the DRX can continue until various events occur which may require the DRX to be adjusted. One event is the reception of data from the aGW by the eNB for the UE. Depending on the amount of data received, the DRX can either be deactivated or the period of the DRX can be reduced. Other events that may require the adjustment of the DRX include a change of signal power level between the eNB and the UE or possibly a gradual increase in the DRX cycle due to continued data inactivity, among others. These other events are discussed in more detail below.

In step 332 the eNB checks to see whether the DRX needs to be adjusted. As indicated above, this could be the situation where data is received to be sent to the UE. Here the DRX can either be deactivated or the period adjusted.

From step 332, if the DRX does not need to be adjusted, the process proceeds back to step 332 and continues to check whether or not the DRX needs to be adjusted.

Once the process in step 332 finds that the DRX does need to be adjusted, the process proceeds to step 334 in which it adjusts the DRX. This could be deactivating the DRX by transmitting a zero value for the DRX or a shorter DRX or a longer DRX as required.

The MAC-PDU with the modified header is sent to the UE in step 336. The MAC-PDU in step 336 could also include any data that has been received by the eNB that needs to be transmitted to the UE.

Referring to FIG. 3b, the process then proceeds to step 318 in which the MAC-PDU with modified header is received at the UE. The UE recognizes the DRX period is to be adjusted and in step 320 it sends an acknowledgement to the eNB and it adjusts its DRX period at the appropriate system frame considering propagation delay and processing delay as at the eNB.

Referring to FIG. 3a, in step 342 the eNB receives the ACK and starts the modified DRX period at the appropriate system frame. The process then proceeds back to step 332 to see whether the DRX needs to be adjusted again.

As will be appreciated by those skilled in the art, one issue with the above occurs in the case of a misinterpretation of an ACK or a NACK. Specifically, the transmitter's hybrid automatic repeat request (HARQ) entity, which is a variation of the ARQ error control method, does not always properly demodulate an ACK or a NACK possibly due to poor channel conditions. Thus, in some situations, one can be interpreted as the other. By having the DRX activation and deactivation occur in the MAC-PDU header, an ACK to NACK or NACK to ACK misinterpretation needs to be handled as misinterpretation of control information signaled between an eNB and a UE can lead to loss of data or possibly radio connection.

A possible solution to the above is the introduction of timer threshold values before activating or deactivating DRX.

When the UE NACKs a MAC-PDU that has DRX header information, the UE is unaware that it should adjust the DRX period. It will expect a retransmission from the eNB. If a NACK to ACK misinterpretation occurs, the eNB receives an ACK and it will not send a retransmission and will change the DRX period as originally signaled. The UE waits for a time to receive the retransmission. This time should be limited by an upper threshold (TH-A) considering possible NACK to ACK misinterpretations. If the UE does not receive a retransmission, it should maintain its current DRX status. The eNB will expect an exchange of information with the UE at the next DRX period. If the UE does not respond, the eNB should revert to the previous DRX period and attempt to "synchronize" with the UE.

Even in the case where a UE ACKs a MAC-PDU, the UE needs to wait for retransmission due to possible ACK to NACK misinterpretation or possible ACK to DTX misinterpretation by the eNB. This waiting time should be limited by an upper threshold (TH-B).

If the UE is missing data as indicated on the L1/L2 signaling channel, assuming the eNB will retransmit at the next earliest opportunity, the UE needs to check the L1/L2 signaling channel within a certain duration (TH-C).

Based on the various threshold parameters above, the minimum time before DRX activation should therefore be greater than (max(TH-A, TH-B)+TH-C). This threshold value can be signaled either by system broadcast or RRC signaling.

Various scenarios are considered herein:

DRX Activation and ACK to NACK Errors:

For an ACK to NACK misinterpretation or an ACK to a discontinuous transmit (DTX) misinterpretation (i.e. the channel conditions are so poor that the ACK appears as noise to the receiver), the following occurs. The UE receives the DRX activation in the header of the MAC-PDU and sends an ACK to the eNB. The eNB receives the ACK but misinterprets it as a NACK or a DTX misinterpretation. This results in the UE activating the DRX before the eNB, which may result in the UE missing the retransmission of the MAC-PDU from the eNB.

In the situations indicated above, an ACK to NACK or DTX misinterpretation can be solved by the UE waiting for the timing margin before activation of DRX. The margin can be based on the normal time that it takes a retransmission to occur and weighted by the average number of HARQ retransmissions to the UE that may be experienced. When the UE acknowledges the retransmission and starts the DRX at the appropriate system frame considering propagation delay and eNB processing time assuming that two consecutive misinterpretations are very unlikely.

DRX Activation and NACK to ACK Errors:

Similarly, if the UE sends a NACK for a MAC-PDU, this could be misinterpreted as an ACK by the eNB. In the case of DRX activation, the eNB activates the DRX before the UE. If the eNB maintains the CQI monitoring for the UE for a short period of time after activating DRX, it will detect that the UE has not activated the DRX indicated by checking the frequency of CQI report and it can re-signal the DRX activation by L1/L2 control signaling. If the eNB releases the CQI resource just after activating DRX and assigns it to another UE, CQI reports from the two UE may collide. The eNB could use Time Division Multiplexing or Code Division Multiplexing to avoid the collision.

One solution is, in the HARQ, the receiver sends a channel quality indicator (CQI). In continuous reception, the channel quality indicator is repeated every 100 milliseconds, for example. Based on this CQI report, the transmitter decides and indicates a coding rate, modulation scheme, and Transport Block size. During active DRX, the eNB may expect a CQI, for example, every second. If the eNB gets this CQI at a different rate (for example 300 milliseconds) it knows that the UE is not in DRX and a correction can occur.

In the case that the RLC is operating in acknowledged mode (AM), when a NACK to ACK misinterpretation occurs, recovery for DRX synchronization between the eNB and the UE is established via the normal RLC retransmission mechanism. This is because the RLC layer in the transmitter will determine that the PDU is lost and therefore instigate normal ARQ recovery by resending the original data not received.

In the case that the RLC is operating in unacknowledged mode (UM mode), no recovery mechanism exists.

Thus assuming that the CQI (channel quality indicator) reporting will be aligned to the DRX length, the eNB will know if DRX activation is completed in the UE by checking the frequency of CQI reporting. If not completed, the eNB may use L1/L2 signaling or send only a MAC-PDU header to correct the DRX activation or reconfiguration.

Another recovery method can triggered when the eNB receives a Timing Advance (TA) Request message from a UE that should be in DRX. When the UE returns power to its transceiver and, hence, emerges from the DRX state, it will often need to send control (e.g. measurement reports) and other data messages the eNB. It is important that the UE have the proper TA before sending these messages so that the UE messages do not partially overlap with messages from other UEs as they arrive at the eNB. Hence, after a DRX cycle the UE will often send a TA Request on a random access channel so that it can get the proper TA from the eNB. If the TA request arrives at a point when the UE should be in DRX, the eNB will know that the UE did not receive the last DRX activation or modification properly. The eNB can then revert to the prior DRX period for that UE and recover DRX-period synchronization.

DRX Deactivation and ACK to NACK Errors:

In the case of DRX deactivation or DRX length reconfiguration, an ACK to NACK or DTX misinterpretation leads to the UE deactivating the DRX before the eNB, which may require no special handling if the UE acknowledges the normal retransmission from the eNB and the eNB successfully received the ACK.

DRX Deactivation and NACK to ACK Errors:

In the case of DRX deactivation or DRX length reconfiguration, a NACK to ACK misinterpretation results in the eNB deactivating the DRX before the UE, which may result in the UE missing the new data transmissions. The possible solution to this is that the eNB indicates DRX deactivation on a MAC-PDU header extension of subsequent MAC-PDUs. Assumptions are that consecutive misinterpretations are very unlikely and that no DRX reconfiguration is needed when only one MAC-PDU is needed to transmit the new data which has arrived at the eNB.

Robust Mac Signaling

The above therefore illustrates some deficiencies of ACK to NACK and NACK to ACK misinterpretations occurring. As will be appreciated by those skilled in the art, standardized methods exist to reduce an ACK/NACK detection error probability for UTRA (UMTS Terrestrial Radio Access). For example, more transmission power can be applied for ACK/NACK messages, repetition of ACK/NACK messages or the use of a preamble and post amble are described in 3GPP TS25.213, section 4.2.2.1 and 3GPP TS25.214 section 6A.1. In these solutions, the UE increases the transmission power of an ACK or a NACK by the amount configured by the RRC, repeats the ACK or NACK N times, where N is usually between 2 and 4, as specified by the RRC, or places a preamble before the ACK or NACK and a post amble after the ACK or NACK. Currently, such configurations are applied to all MAC-PDUs carried on a radio bearer once activated. Such methods may also be applicable to LTE.

The above, however, may not be optimal for the case of MAC DRX signaling or any other signaling in which a configuration message is sent in the MAC-PDU header. As will be appreciated, a configuration message can include both the DRX message described above, and other messages, and is not meant to be limited in the present disclosure. Preferably, a more robust configuration of UE HARQ feedback transmission is applied when a MAC-PDU contains important control information. In this preferred embodiment, the standard configuration of UE HARQ feedback transmission is applied when a MAC-PDU contains only data or control information not requiring robust feedback signaling. By applying a more robust configuration for UE HARQ feedback only when the MAC-PDU contains control information, this provides for a more efficient usage of radio resources.

In operation, the proposed solution comprises the RRC signaling a configuration for UE HARQ feedback transmission for a normal MAC-PDU and a robust configuration for UE HARQ feedback transmission for a MAC-PDU which contains important control information in its header, which is subsequently identified to require robust feedback transmission. The RRC signaling occurs when a radio bearer is configured or reconfigured. Alternatively the RRC signaling can be configured as common for all radio bearers and can be signaled at RRC connection set up or as a default configuration via system broadcast information. Subsequently, when a MAC-PDU is transmitted, the eNB indicates if the UE should use the standard or the robust configuration for the HARQ feedback transmission. As will be appreciated by those skilled in the art, any of the known robust HARQ feedback techniques could be used. Specifically, the transmission power could be increased, the ACK or NACK could be repeated a specified number of times or a preamble or post amble could be added to the ACK or NACK.

The indication between the eNB and the UE to indicate whether a robust configuration for HARQ feedback transmission should be utilized could involve various techniques. Four are described below.

Use of a Reserved Downlink Shared Control Channel (DLSCCH)

Figure 4A:
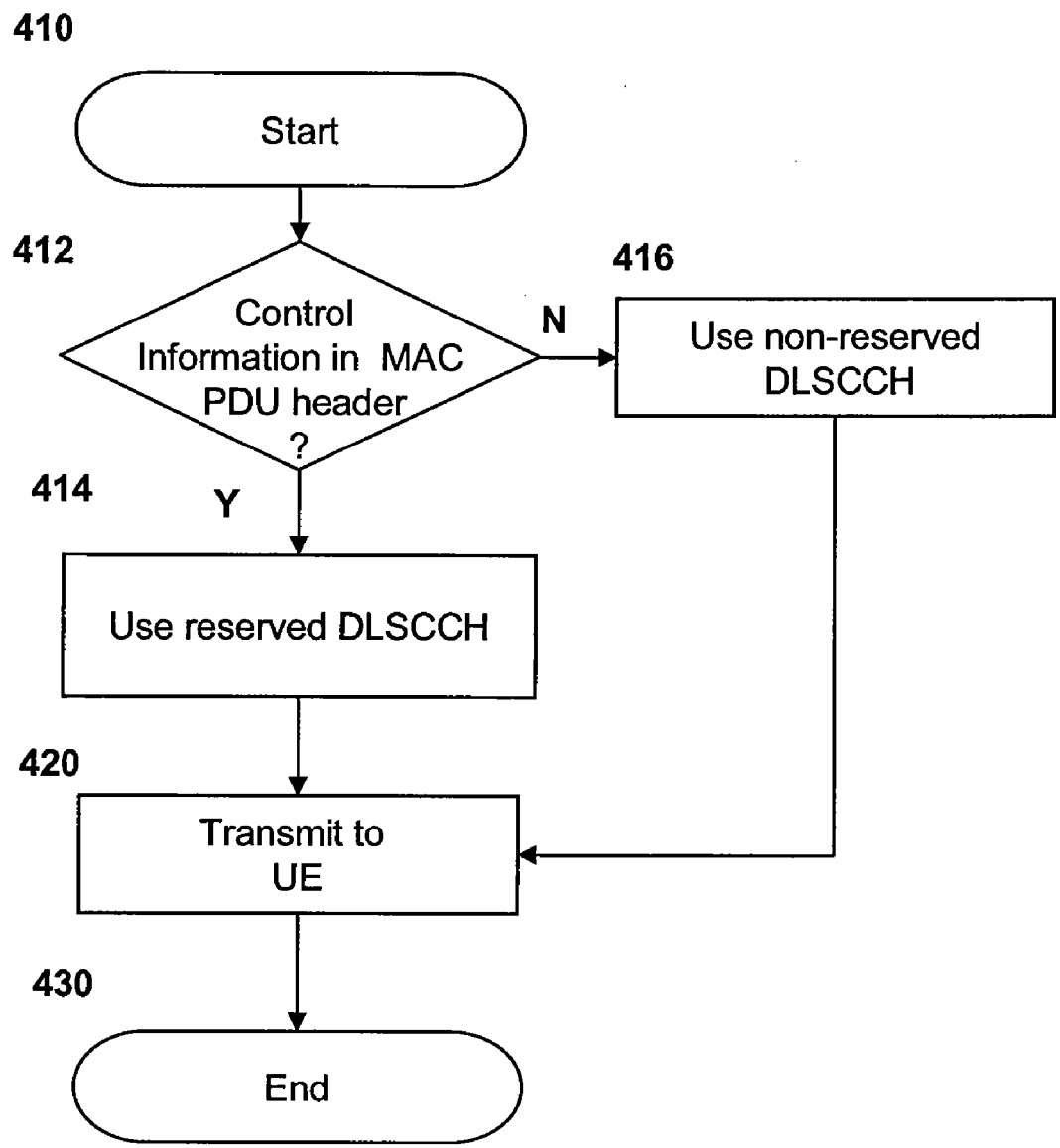
FIG. 4a is a flow chart showing a method on an eNB to indicate robust HARQ feedback transmission should be used by using a reserved DLSCCH.
Figure 4B:
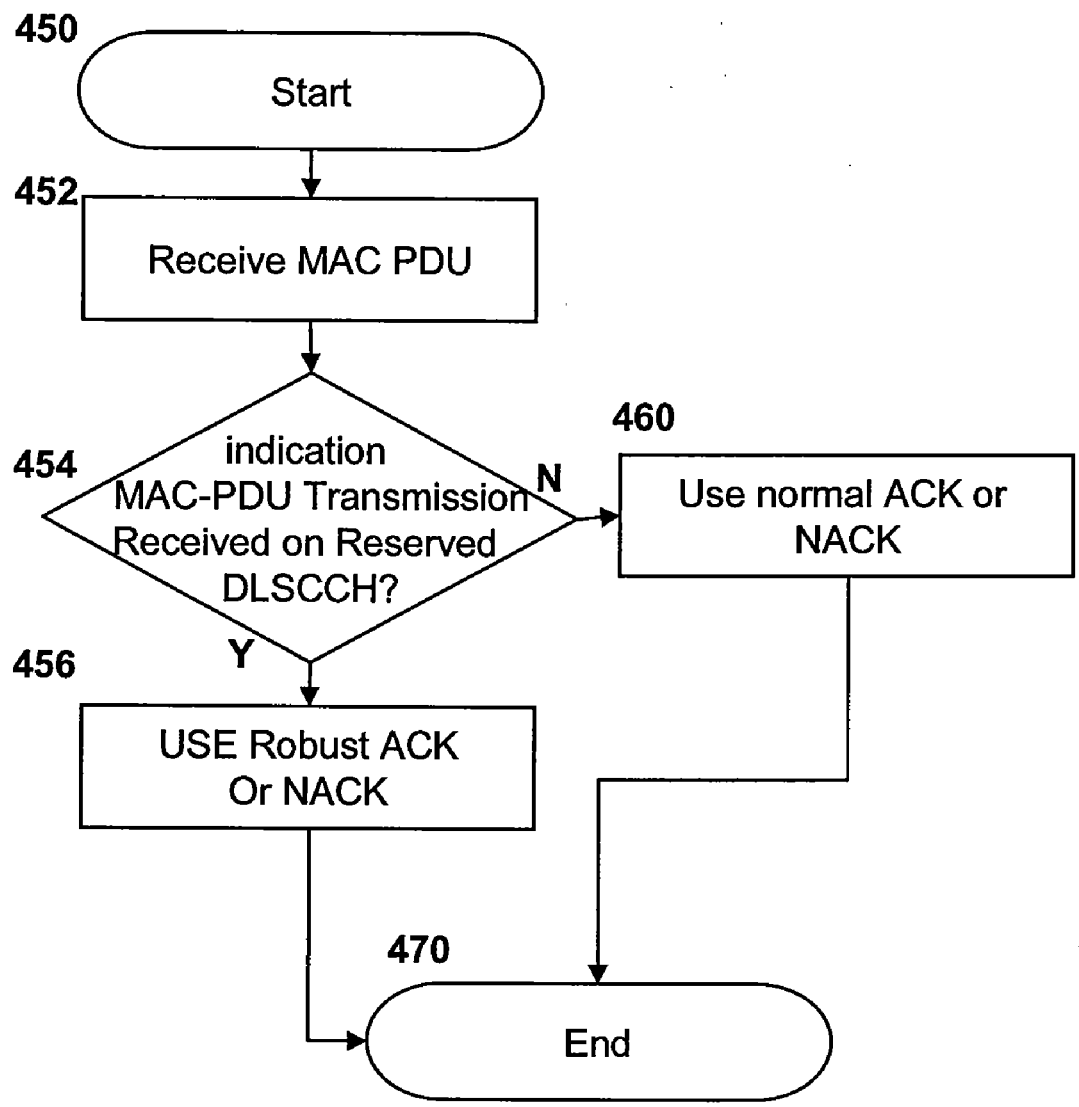
FIG. 4b is a flow chart showing a method on a UE to utilize robust HARQ feedback transmission using a reserved DLSCCH.

Reference is now made to FIGS. 4a and 4b.

As will be appreciated by those skilled in the art, a downlink shared control channel (DLSCCH) is used to indicate the transmission of a MAC-PDU on an associated DL-SCH. A UE will typically monitor several downlink shared control channels. A first proposed means for an indication between the eNB and the UE is the utilization of a reserved DLSCCH to indicate transmission of a MAC-PDU including control information to the UE. When the radio bearer is configured initially, the UE is informed by the RRC of which DLSCCHs are reserved for that purpose. The RRC will provide the UE with information about the type of feedback to use. After the UE receives the MAC-PDU on the downlink shared channels associated with the reserved DLSCCH, the UE will then apply the configuration for HARQ feedback transmission when, depending on the results of the decoding process, it sends an ACK or NACK.

Referring to FIG. 4a, an eNB starts the process at step 410 and proceeds to step 412 in which the eNB checks whether control information is being sent in the MAC-PDU header.

If yes, the eNB proceeds to step 414 in which it uses the reserved DLSCCH, to indicate the impending transmission of a MAC-PDU for the UE. Otherwise, the process proceeds to step 416 in which it uses a non-reserved DLSCCH, to indicate the impending transmission of a MAC-PDU for the UE.

The eNB then transmits the MAC-PDU in step 420 utilizing the downlink shared channel associated with the DLSCCH assigned in steps 416 or 414.

The process then ends at step 430.

Referring to FIG. 4b, on the UE the process starts at step 450 and proceeds to step 452, in which a MAC-PDU is received. The process then proceeds to step 454 in which a check is done to see whether or not the indication of MAC-PDU transmission was received on a reserved DLSCCH. If yes, the process proceeds to step 456 in which a robust ACK or NACK is used. Otherwise, the process proceeds to step 460 in which a normal ACK or NACK is used.

The process then ends at step 470.

As will be appreciated, in the existing implementation of HSDPA (High Speed Downlink Packet Access) within UMTS, the UE is required to listen to a set of up to four DLSCCHs for an indication of a data transmission on a DL-SCH(HS-PDSCH).

The above establishes that one of the identified DLSCCHs is dedicated for the transmission of a MAC-PDU which also contains specific control data. In other words, a special action is required when receiving this PDU on the DL-SCH compared to receiving one indicated on another DLSCCH.

In one embodiment, a repetition scheme for the HARQ feedback process for the reception of the PDU is applied, thereby providing more reliable feedback detection by the network. This then gives the network a greater reliability that the UE has implemented the new configuration as sent via the control information in the MAC header and that the UE can also act on this indicated control information accordingly.

While repetition of the HARQ feedback is one specific behavior that may be interpreted from the use of the special DLSCCH, it is also possible for several other specific behaviors to be identified.

Specifically, it will be recognized by those skilled in the art that the MAC-PDU could have a different format when compared to a MAC-PDU not indicated on the reserved DLSCCH control channel in order to incorporate additional header information e.g. DRX period. Thus, the format of the bits will be interpreted in a specific manner different to the MAC-PDU header indicated on another DLSCCH control channel. This ensures correct decoding and interpretation of this MAC-PDU signaled using this reserved DLSCCH. Also, a further consideration is that when using the alternate MAC-PDU format, data may or may not be included.

As an extension to the above, a reserved DLSCCH could be used as a default indication channel for UEs that are accessing the network in an unsynchronized manner. This would then enable special configured signaling to be incorporated into the MAC-PDU which may differ from other regularly used MAC-PDU formats. This could include an indication of temporary network identifiers or a change of existing identifiers if necessary within the MAC header.

Use of One Bit Indication on DLSCCH

As an alternative to using a reserved downlink shared control channel, a single bit could be defined in the information signaled on the DLSCCH. The bit is used to indicate if the UE should use standard or a robust configuration for HARQ feedback transmission when it sends an ACK or a NACK after receiving the MAC-PDU on the downlink shared channel associated with the DLSCCH. When the eNB sends a MAC-PDU with control information in the header, the eNB sets the bit.

As will be appreciated by those skilled in the art, the bit could be placed anywhere. For example, the bit could be placed next to the HARQ process indicator field. However, this is not meant to limit the bit placement, and as indicated above, the bit could be placed anywhere in the information signaled on the DLSCCH.

Figure 5A:
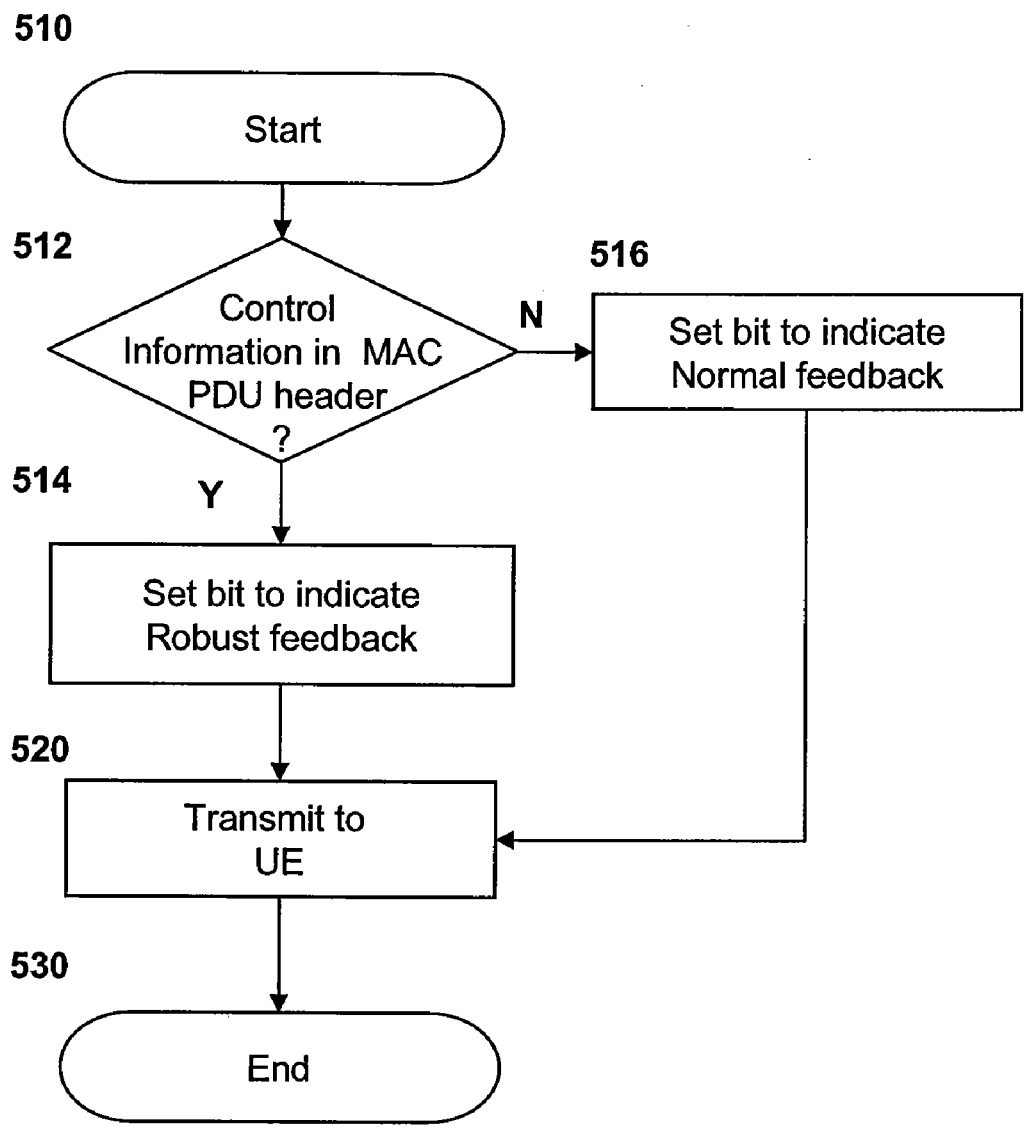
FIG. 5a is a flow chart showing a method on an eNB to indicate robust HARQ feedback transmission should be used by using a one bit indication on DLSCCH.
Figure 5B:
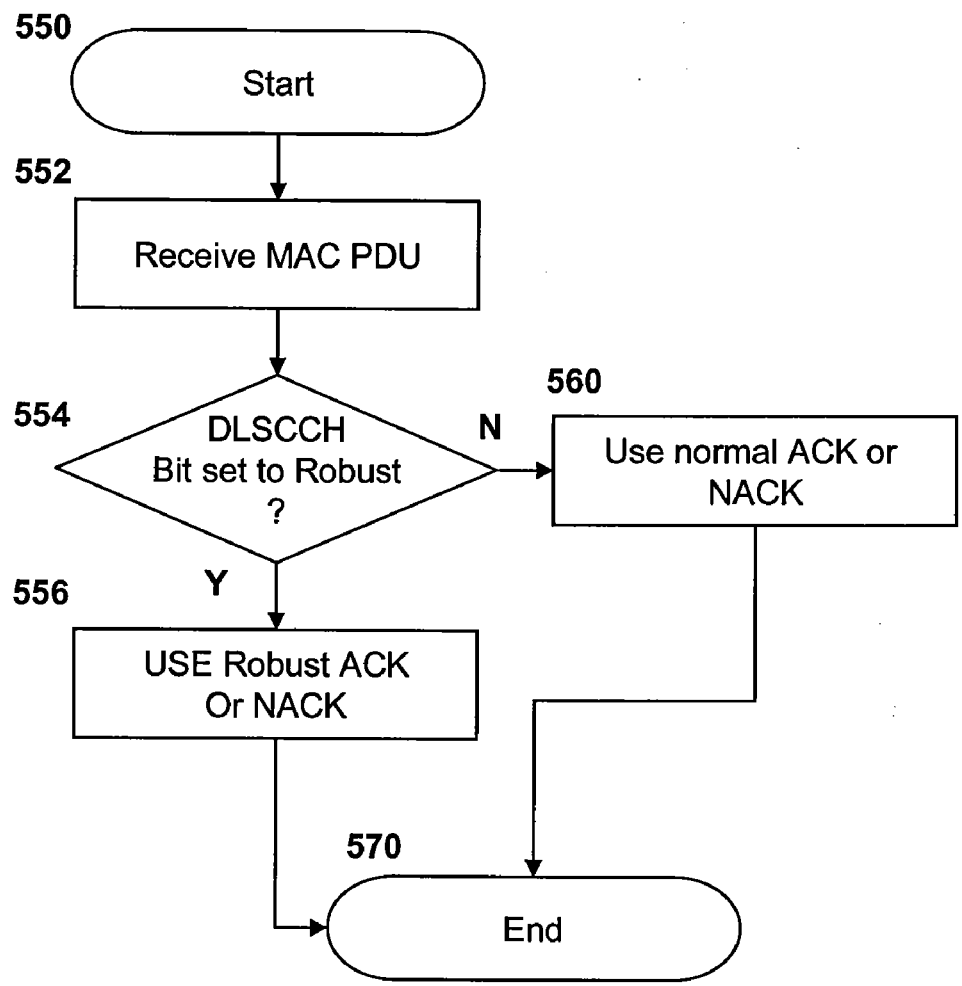
FIG. 5b is a flow chart showing a method on a UE to utilize robust HARQ feedback transmission using a one-bit indication on DLSCCH.

Reference is now made to FIGS. 5a and 5b. FIG. 5a illustrates a flow diagram from the eNB perspective. Specifically, the process starts at step 510 and proceeds to step 512 in which the eNB checks whether control information is to be sent in the MAC-PDU header. If yes, the process to step 514 in which the bit in the DLSCCH is set to indicate robust feedback.

If, from step 512, the eNB determines that no control information is to be sent in the MAC-PDU header, the process proceeds to step 516 in which the bit in the DLSCCH is set to indicate normal feedback.

The process then proceeds from step 514 or step 516 to step 520 in which the eNB transmits the MAC-PDU and signals on the DLSCCH.

The process then ends at step 530.

Reference is now made to FIG. 5b which illustrates the process from the UE perspective.

The process starts at step 550 and proceeds to step 552 in which the UE receives the MAC-PDU.

The process then proceeds to step 554 in which the UE verifies the indication received on the DLSCCH to see whether the bit is set to indicate the use of robust or normal feedback. If the bit is set to robust feedback, the proceeds to step 556 in which a robust ACK or NACK is used depending on the result of the decoding process. Otherwise, the process proceeds to step 560 in which a normal ACK or NACK is used depending on the result of the decoding process.

The process then proceeds to step 570 and ends.

In the case where there is a one bit indicator to indicate the requirement of special handling for certain MAC-PDUs, no such restriction would necessarily be imposed for successive transmissions. However, it may be appreciated that if a control MAC-PDU changes some configurations and/or requires some special behavior for HARQ feedback signaling, it may not be desirable to transmit in successive TTIs in any case, due to allowing time for the UE to reconfigure itself according to the control information received.

Use of Two Radio Network Temporary Identifiers (RNTI)

A further indication between the eNB and UE that more robust configuration is required for HARQ feedback transmissions could be the use of two RNTIs allocated to the UE by the eNB. A first RNTI is used when MAC-PDUs without control information are transmitted to the UE and the other is used when MAC-PDUs with control information are transmitted to the UE. The UE recognizes which RNTI is used and applies a different configuration for transmitting HARQ feedback, depending on the RNTI indicated. The eNB signals the two sets of RNTI and configuration of HARQ feedback transmission by using the RRC.

As will be appreciated by those skilled in the art, any two RNTIs can be used. In one embodiment, an RNTI and its logical complement could be used. Thus, instead of two RNTIs being sent to the UE, one could be chosen and signaled. The processor on the UE would then be able to determine the complement. In the case of processing, the UE would first check, on a received signal to see if the RNTI matches. If the RNTI does not match, the complement could then be taken and used to see if it matches. If one of the RNTI or its complement matches, the UE knows that it should use either robust or normal HARQ feedback transmissions depending on which RNTI matches.

Alternatively, two RNTI values could be chosen and sent to the UE. In this case, the matching calculations, for example XOR and CRC calculations, are performed between the first RNTI and the received signal and then the second RNTI and the received signal. If one of the RNTIs matches, the UE will know which HARQ feedback transmission to use, whether robust or normal depending on which RNTI matches.

Figure 6A:
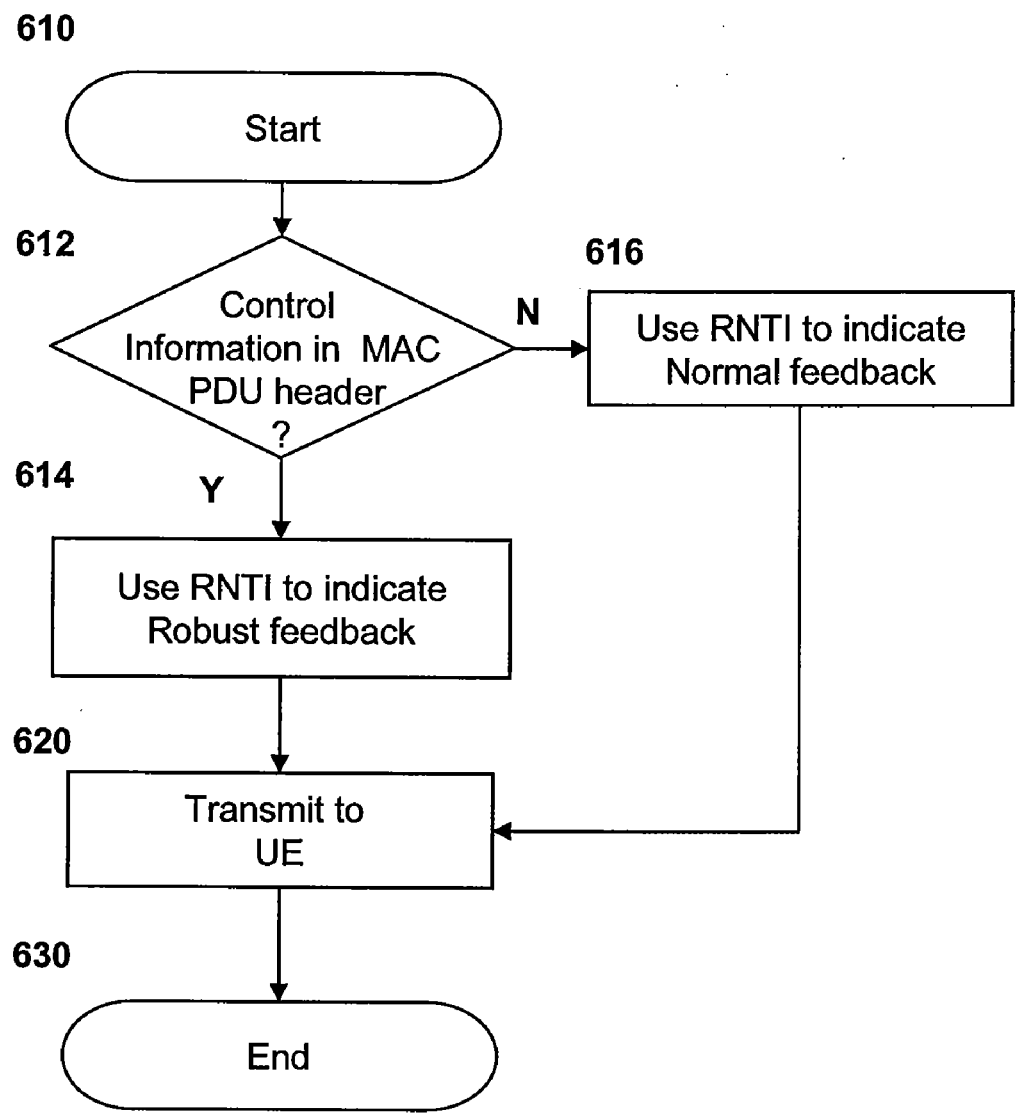
FIG. 6a is a flow chart showing a method on an eNB to indicate robust HARQ feedback transmission should be used by using two RNTIs.

Reference is now made to FIG. 6a. FIG. 6a illustrates a process diagram for an eNB. The process starts in step 610 and proceeds to step 612 in which a check is made to see whether control information needs to be sent in a MAC-PDU header.

If yes, the process proceeds to step 614 in which the RNTI used for the transmission of the MAC-PDU is set to the robust feedback RNTI, as described above.

If, in step 612, the eNB finds that control information is not to be sent in the MAC-PDU header, then the process proceeds to step 616. In step 616, the eNB sets the RNTI to the RNTI expected for normal feedback.

The process then proceeds from step 614 or step 616 to step 620 in which the MAC-PDU is transmitted using the RNTI from steps 614 or 616.

The process then proceeds to step 630 and ends.

Figure 6B:
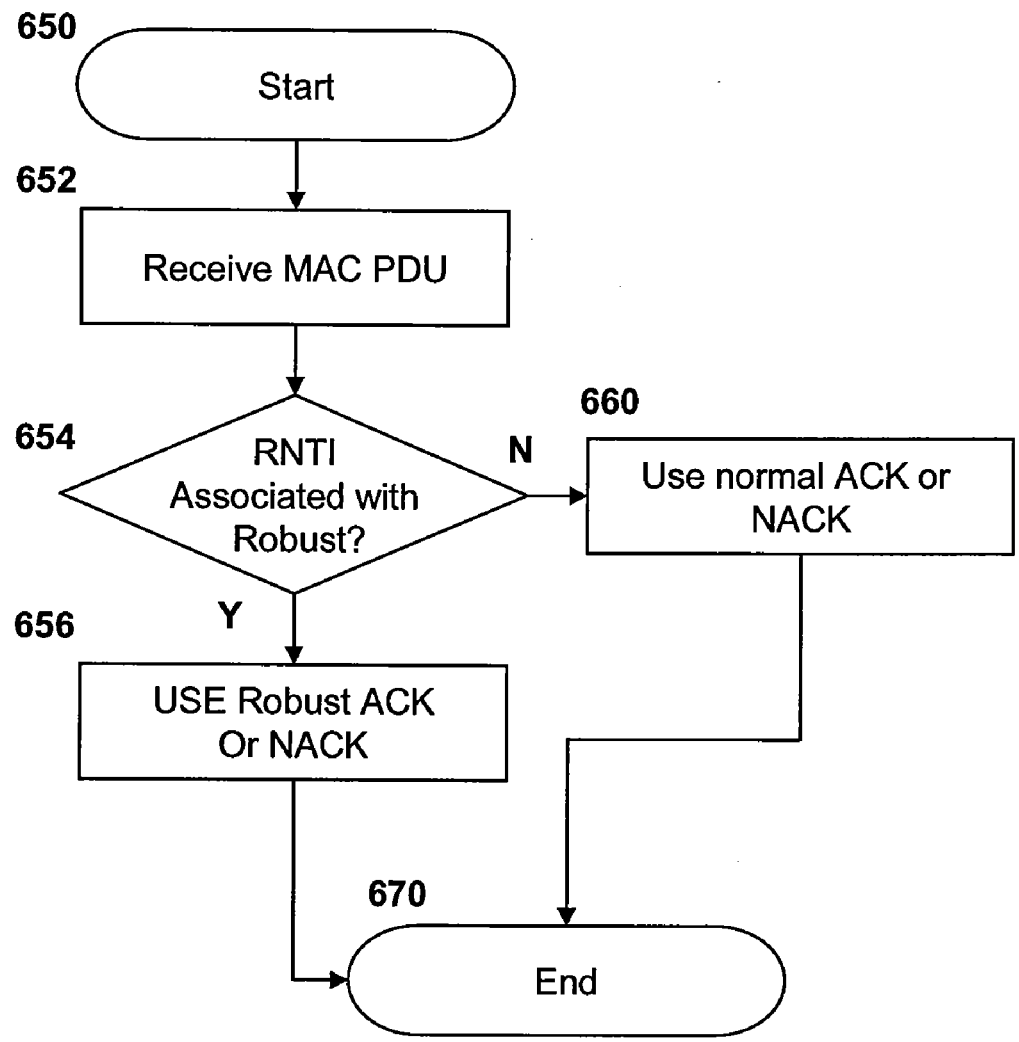
FIG. 6b is a flow chart showing a method on a UE to utilize robust HARQ feedback transmission using two RNTIs.

On the UE side, reference is now made to FIG. 6b. The process starts at step 650 and proceeds to step 652 in which the UE receives the MAC-PDU.

The process then proceeds to step 654 in which the UE determines whether the RNTI associated with the MAC-PDU is for robust HARQ transmission. If yes, the process proceeds to step 656 in which a robust ACK or NACK is used depending on the results of the decoding process.

If no, the process proceeds from step 654 to step 660 in which a normal ACK or NACK is used depending on the results of the decoding process.

The process then proceeds to step 670 and ends.

Use of a MAC Header Field

A further alternative to indicating to the UE from the eNB that a more robust HARQ feedback transmission is required is the use of an indication within the MAC header field. As will be appreciated by those skilled in the art, the three methods for indication described above all use the DLSCCH to indicate if a standard or robust configuration should be used for HARQ feedback transmission. This alternative is desirable in the case were the use of the DLSCCH is considered too costly from a system resource point of view.

The fourth indication is therefore a new field defined in the MAC-PDU header to indicate more repetition in transmitting an ACK from the UE to eNB. For example, the number of ACK repetitions is set to one, two or more higher than the normal repetition configured by the RRC if the header contains a field set to one or two.

As will be appreciated, the UE only understands if more repetition is required for HARQ feedback when it successfully decodes the received MAC-PDU. If the decoding of the MAC-PDU fails then the UE applies the normal repetition as configured by the RRC when it sends its NACK. This is better illustrated with reference to FIGS. 7a and 7b.

Figure 7A:
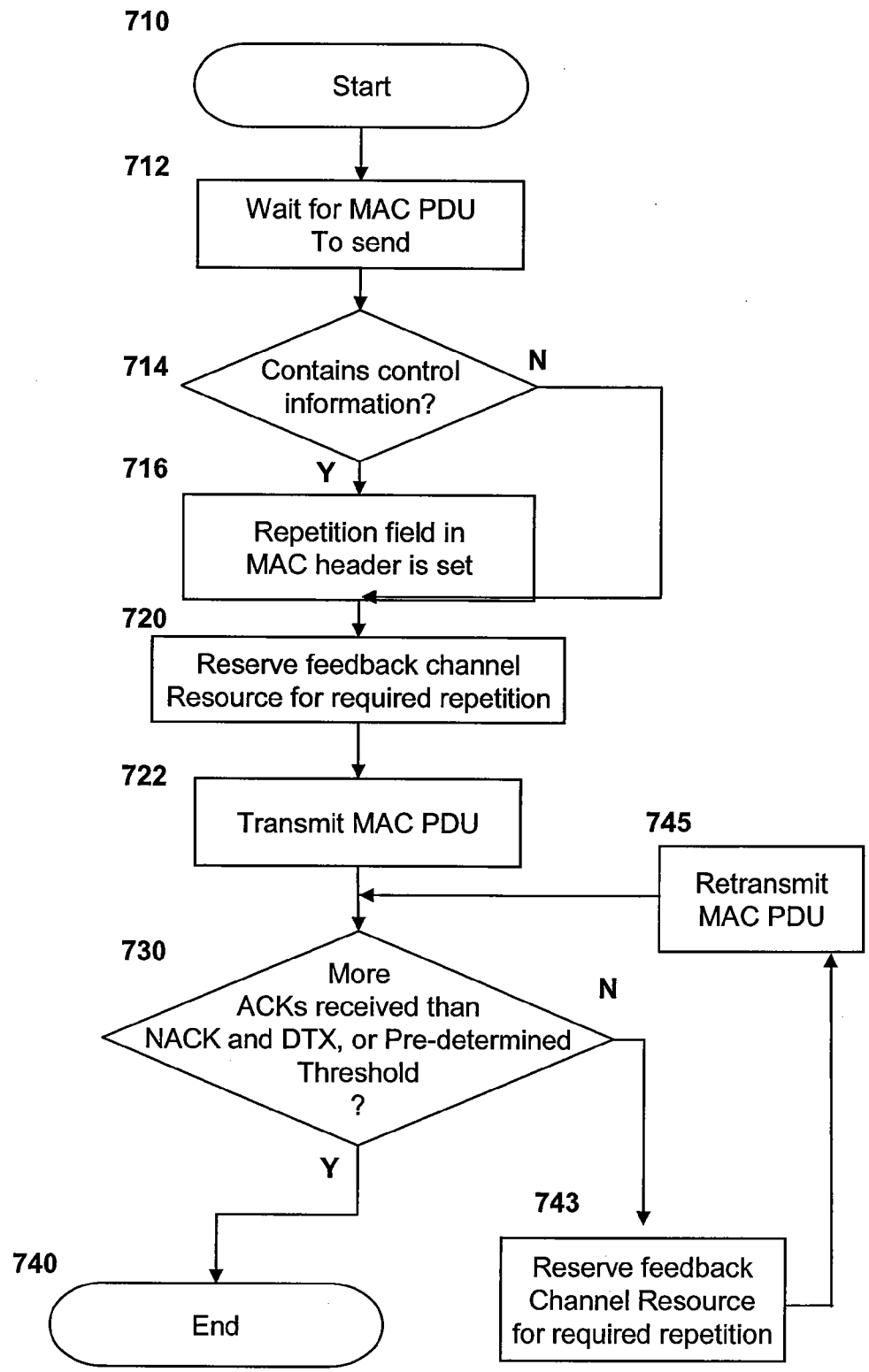
FIG. 7a is a flow chart showing a method on an eNB to indicate how repetition for HARQ feedback transmission should be used.

FIG. 7a illustrates the eNB behavior for setting additional repetition when a MAC-PDU has control information in its header. The process starts at step 710 and in step 712 the eNB waits for a MAC-PDU to send to the UE.

Once a MAC-PDU is to be sent to the UE, the process proceeds to step 714 in which a check is made to see whether or not the MAC-PDU header contains control information. If yes, the process proceeds to step 716 in which a repetition field in the MAC-PDU header is set. As indicated, the repetition field could indicate a number, such as one or two, and represents an increase in the number of repetitions for transmitting an ACK or a NACK. Alternative configurations could use the number of repetitions instead of an increase indication. In another alternative a single bit may be used to indicate that the UE should apply a predefined increment of repetitions. The predetermined interval may be pre-signaled to the UE from the eNB via explicit signaling; either by system broadcast or RRC signaling.

From step 716, the process proceeds to step 720. Also, if the MAC-PDU header does not contain any control information, the process proceeds from step 714 to step 720.

In step 720, the eNB reserves a feedback channel resource for the required repetition. As will be appreciated, this needs to be set whether or not the MAC-PDU has control information in its header.

The process then proceeds to step 722 in which the MAC-PDU is transmitted.

The process then steps to step 730 in which receives the HARQ feedback from the UE and it checks whether more ACKs have been received than NACKs or DTXs. Alternatively the eNB checks whether the number of ACKs exceeds a configured threshold. If yes, the process ends at step 740. For example, the eNB waits for 3 repetitions, and then 2 or 3 ACKs are needed for successful transmission. Otherwise, the step retransmits the MAC-PDU in step 745 and again determines whether more ACKs are received than NACKs or DTXs in step 730.

As will be appreciated by those skilled in the art, the check of step 730 also checks to see whether or not the correct, or pre-determined, number of ACKs or NACKs are received. If the correct number of ACKs or NACKs are not received, then the eNB will know that either the UE did not decode the header correctly or a DTX was received and will thus also request a reserve feedback channel resource for the required repetition in step 743 and retransmit in step 745.

Figure 7B:
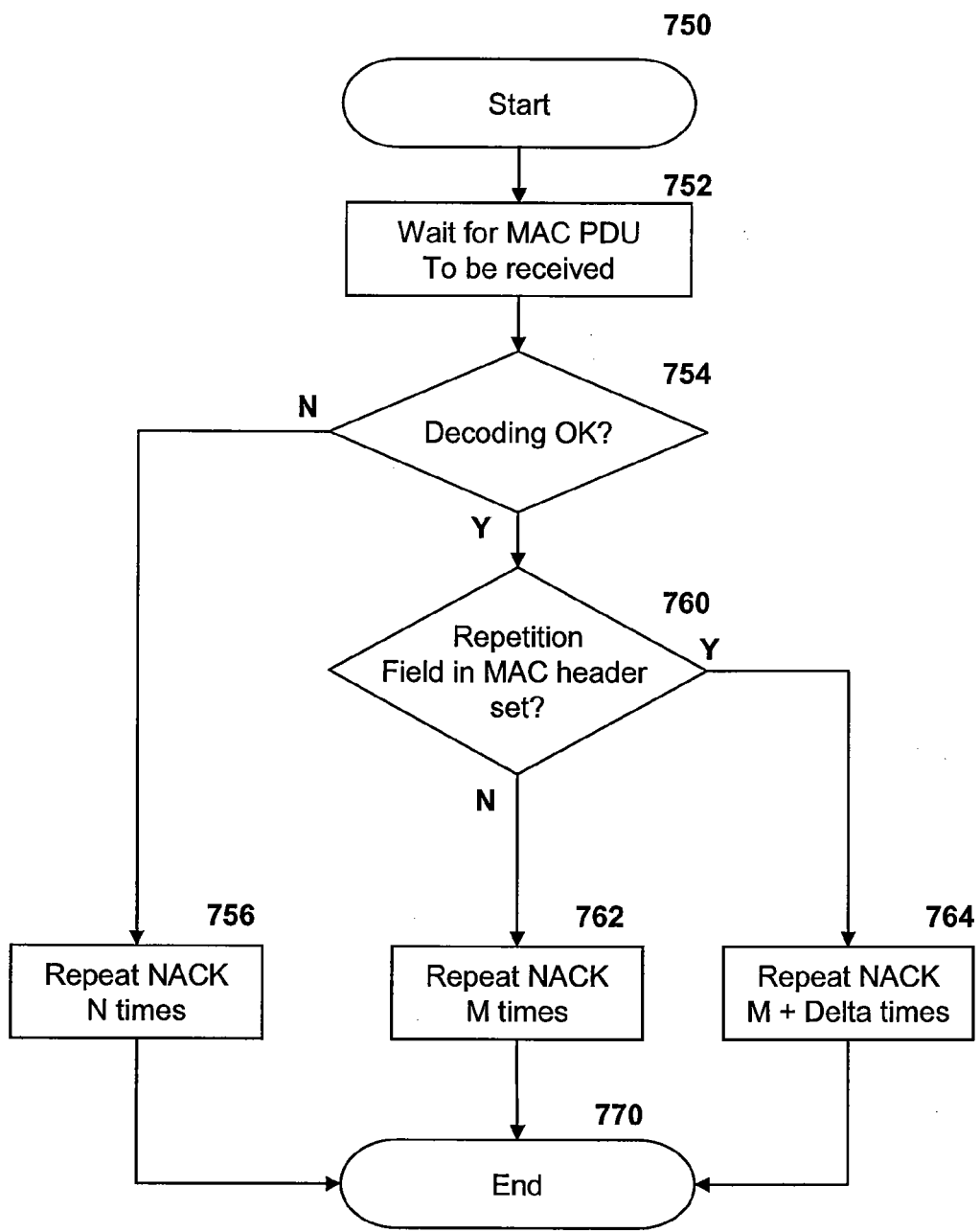
FIG. 7b is a flow chart showing a method on a UE to utilize repetition for HARQ feedback transmission.

From the UE perspective, reference is now made to FIG. 7b. The process starts in step 750 and proceeds to step 752 in which in waits for a MAC-PDU to be received.

Once a MAC-PDU is received, the process proceeds to step 754 in which it checks to see whether decoding occurred properly.

If yes, the process then proceeds to step 760 in which it checks whether or not a repetition field is set in the MAC-PDU header.

Depending on the results of the checks in step 754 or step 760, the ACK or NACK is repeated by a specific number of times. In particular, if the decoding does not occur properly in step 754, then the process proceeds to step 756 in which it repeats a NACK N times. N is specified by the RRC and is typically 1.

If the repetition field is not set as found in step 760, the process proceeds to step 762 in which an acknowledgement is repeated M times. Here M is set by the RRC and is typically 1.

If the repetition field is set to a delta value as determined in step 760, the process proceeds to step 764 in which the ACK is repeated M plus delta times. As indicated above, M is set by the RRC and delta is determined by the repetition field in the MAC-PDU header.

From steps 756, 762 and 764 the process proceeds to step 770 and ends.

Reference is now made to Table 1 below.

TABLE 1

| event | probability |
|---|---|
| Data Indication Failure | 0.01 |
| First Reception Failure | 0.1 |
| ACK->ACK | 0.94 |
| ACK->NACK | 0.01 |
| ACK->DTX | 0.05 |
| NACK->NACK | 0.949 |
| NACK->ACK | 0.001 |
| NACK->DTX | 0.05 |
| DTX->DTX | 0.9 |
| DTX->ACK | 0.05 |
| DTX->NACK | 0.05 |
| Success | 0.891 |
| Fail | 0.099 |
| Miss | 0.01 |

Table 1 illustrates the probabilities of interpreting various messages that have been sent. In particular, as illustrated in Table 1, the probability of an ACK being sent and an ACK being interpreted by the eNB is 94%. The probability of an ACK being sent and an NACK being interpreted is 1%. The probability of an ACK being sent and an DTX being interpreted is 5%. The table illustrates the remaining probabilities.

In the case of two repetitions, reference is now made to Table 2.

TABLE 2

| Reception by UE | 1st UE resp. by eNB | 2nd UE resp. by eNB | eNB behaviour | Probability |
|---|---|---|---|---|
| Success UE sends ACK and ACK | ACK | ACK | success | 0.7872876 |
| | ACK | NACK | retransmission | 0.0083754 |
| | ACK | DTX | retransmission | 0.041877 |
| | NACK | ACK | retransmission | 0.0083754 |
| | NACK | NACK | retransmission | 0.0000891 |
| | NACK | DTX | retransmission | 0.0004455 |
| | DTX | ACK | retransmission | 0.041877 |
| | DTX | NACK | retransmission | 0.0004455 |
| | DTX | DTX | retransmission | 0.0022275 |
| Fail UE sends One NACK | NACK | DTX | retransmission | 0.0845559 |
| | NACK | ACK | retransmission | 0.00469755 |
| | NACK | NACK | retransmission | 0.00469755 |
| | ACK | DTX | retransmission | 0.0000891 |
| | ACK | ACK | success | 0.00000495 |
| | ACK | NACK | retransmission | 0.00000495 |
| | DTX | DTX | retransmission | 0.004455 |
| | DTX | ACK | retransmission | 0.0002475 |
| | DTX | NACK | retransmission | 0.0002475 |
| Indication missed DTX | DTX | DTX | retransmission | 0.0081 |
| | DTX | ACK | retransmission | 0.00045 |
| | DTX | NACK | retransmission | 0.00045 |
| | ACK | DTX | retransmission | 0.00045 |
| | ACK | ACK | success | 0.000025 |
| | ACK | NACK | retransmission | 0.000025 |
| | NACK | DTX | retransmission | 0.00045 |
| | NACK | ACK | retransmission | 0.000025 |
| | NACK | NACK | retransmission | 0.000025 |

As indicated in Table 2, the UE may send an ACK, NACK or DTX. If two are sent by the UE, the probabilities of receiving two ACKs, thereby indicating success, is indicated by the various fields.

Specifically, from Table 2, success is indicated in the top line where the UE sends an ACK and two consecutive ACKs are received by the eNB. The probability of this is calculated by the probability of successful data indication*the probability of successful data reception*probability of ACK received as ACK*probability of ACK received as ACK=(1−0.01)*(1−0.1)*(1−0.01−0.05)*(1−0.01−0.05)=78.73%.

In the remaining cases, the UE does not receive two ACKs and therefore retransmits the MAC-PDU.

In the case of failure, the UE sends a NACK. The probability that two ACKs are interpreted by the eNB is very small, as indicated by the table. Similarly, if the UE indicates DTX, the probability that the eNB interprets two ACKs is also very small.

The performance of the above indicates that the success occurs 78.73% of the time. A detection error occurs with a probability of 0.00002995 and unnecessary retransmission occurs with the probability of 0.0502524.

The detection error probability in these cases is much smaller than the case where the repetition is not applied. Meanwhile, overhead, such as unnecessary retransmissions, is kept quite low, assuming the frequency of MAC-PDU with control information is 1% of the frequency of MAC-PDUs with only user payload.

The above is further improved with three repetitions. This is illustrated by Table 3.

TABLE 3

| Probability | 2 repetition | 3 repetition |
|---|---|---|
| Success | 78.73% | 88.18% |
| Detection error | 0.003% | 0.033% |
| Overhead | 5.0% | 0.30% |

The above therefore indicates robust MAC Signaling in which a MAC-PDU with control information in the header is sent to the eNB with an indication that robust HARQ feedback transmission should be used.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for indicating robust Medium Access Control (MAC) signaling comprising the steps of:
   checking, at an evolved Node B (eNB), whether a MAC protocol data unit (MAC-PDU) contains control information; and
   if yes, the eNB providing an indication to a user equipment (UE) to use a robust configuration for a hybrid automatic repeat request (HARQ) feedback transmission;
   wherein the use of the robust configuration for a hybrid automatic repeat request reduces the probability of HARQ feedback signal misinterpretation; and
   wherein the indication comprises sending the MAC-PDU on a reserved downlink shared control channel (DLSCCH) if the MAC-PDU requires robust HARQ feedback transmission and sending the MAC-PDU on a non-reserved DLSCCH if the MAC-PDU does not require robust HARQ feedback transmission.

2. The method of claim 1, wherein a MAC-PDU indicated on a reserved DLSCCH has a different format when compared to a MAC-PDU indicated on a non-reserved DLSCCH.

3. The method of claim 1, wherein the robust HARQ feedback transmission comprises one of: increasing transmission power for the HARQ feedback transmission; repeating acknowledgement or non-acknowledgement a pre-specified number of times; and adding a preamble and a post-amble to the acknowledgement and non-acknowledgment messages.

4. The method of claim 1, wherein the method is performed on an enhanced node B.

5. A method for interpreting an indication of robust Medium Access Control (MAC) signaling comprising the steps of:
   receiving, at a User Equipment (UE), a MAC protocol data unit (MAC-PDU);
   checking whether an indication for robust hybrid automatic repeat request (HARQ) feedback transmission is provided; and
   if yes, utilizing, at the UE, robust hybrid automatic repeat request (HARQ) feedback transmission,
   wherein the use of the robust HARQ feedback transmission reduces the probability of HARQ feedback signal misinterpretation; and
   wherein the indication comprises receiving the MAC-PDU on a reserved downlink shared control channel (DLSCCH) if the MAC-PDU requires robust HARQ feedback transmission and receiving the MAC-PDU on a non-reserved DLSCCH if the MAC-PDU does not require robust HARQ feedback transmission.

6. The method of claim 5, wherein a MAC-PDU indicated on a reserved DLSCCH has a different format when compared to a MAC-PDU indicated on a non-reserved DLSCCH.

7. The method of claim 6, wherein the format of bits is interpreted based on whether the sending of the MAC-PDU was indicated on a reserved DLSCCH or a non-reserved DLSCCH.

8. The method of claim 6, wherein the reserved DLSCCH is used as a default indication channel for UEs that are accessing the network in an unsynchronized manner.

9. The method of claim 5, wherein the indication signals that a predefined increment, pre-configured by a Radio Resource Control (RRC), is used as the number by which to increase the number of repetitions of HARQ feedback transmission.

10. The method of claim 5, wherein the robust HARQ feedback transmission comprises one of: increasing transmission power for the HARQ feedback transmission; repeating acknowledgement or non-acknowledgement a pre-specified number of times; and adding a preamble and a post-amble to acknowledgement and non-acknowledgment messages.

11. The method of claim 5 wherein the robust configuration for HARQ feedback transmission is signaled by a Radio Resource Control signaling during radio bearer configuration or re-configuration.

12. An enhanced Node B (eNB) adapted configured to indicate robust Medium Access Control (MAC) signaling, characterized by:
   a checking module to check whether a MAC protocol data unit (MAC-PDU) contains control information; and
   a providing module to provide an indication to use a robust configuration for a hybrid automatic repeat request (HARQ) feedback transmission;
wherein the use of the robust configuration for a hybrid automatic repeat request reduces the probability of HARQ feedback signal misinterpretation;
   wherein the indication comprises one of:
   a) sending the MAC-PDU on a reserved downlink shared control channel (DLSCCH) if the MAC-PDU requires robust HARQ feedback transmission and sending the MAC-PDU on a non-reserved DLSCCH if the MAC-PDU does not require robust HARQ feedback transmission; and
   b) a different Radio Network Temporary Identity (RNTI) for MAC-PDUs requiring robust HARQ feedback transmission than the RNTI for MAC-PDUs not requiring robust HARQ feedback transmission.

13. The eNB of claim 12, wherein the checking module further checks the HARQ feedback received and compares the number of feedback messages expected according to the associated robust HARQ indicator of the originally transmitted MAC-PDU.

14. A User Equipment (UE) configured to interpret an indication of robust Medium Access Control (MAC) signaling, characterized by:
   a receiving module for receiving a MAC protocol data unit (MAC-PDU);
   a checking module for checking whether an indication for robust hybrid automatic repeat request (HARQ) feedback transmission is provided; and
   a utilizing module for utilizing robust hybrid automatic repeat request (HARQ) feedback transmission;
   wherein the use of the robust HARQ feedback transmission reduces the probability of HARQ feedback signal misinterpretation; and
   wherein the indication comprises one of:
   a) receiving the MAC-PDU on a reserved downlink shared control channel (DLSCCH) if the MAC-PDU requires robust HARQ feedback transmission and receiving the MAC-PDU on a non-reserved DLSCCH if the MAC-PDU does not require robust HARQ feedback transmission; and
   b) a different Radio Network Temporary Identity (RNTI) for MAC-PDUs requiring robust HARQ feedback transmission than the RNTI for MAC-PDUs not requiring robust HARQ feedback transmission.

15. A method for indicating robust Medium Access Control (MAC) signaling comprising the steps of:
   checking, at an evolved Node B (eNB), whether a MAC protocol data unit (MAC-PDU) contains control information; and
   if yes, the eNB providing an indication to a user equipment (UE) to use a robust configuration for a hybrid automatic repeat request (HARQ) feedback transmission;
   wherein the use of the robust configuration for a hybrid automatic repeat request reduces the probability of HARQ feedback signal misinterpretation; and
wherein the indication comprises the use of a different Radio Network Temporary Identity (RNTI) for MAC-PDUs requiring robust HARQ feedback transmission from the RNTI for MAC-PDUs not requiring robust HARQ feedback transmission.

16. The method of claim 15, wherein two RNTIs are signaled to a User Equipment (UE) utilizing a Radio Resource Control (RRC) message.

17. The method of claim 15, wherein one RNTI is signaled to a User Equipment (UE) utilizing a Radio Resource Control signaling and the UE takes a complement of the RNTI to use to determine the alternative RNTI.

18. A method for interpreting an indication of robust Medium Access Control (MAC) signaling comprising the steps:
   receiving, at a User Equipment (UE), a MAC protocol data unit (MAC-PDU);
   checking whether an indication for robust hybrid automatic repeat request (HARQ) feedback transmission is provided; and if yes, utilizing, at the UE, robust hybrid automatic repeat request (HARQ) feedback transmission,
wherein the use of the robust HARQ feedback transmission reduces the probability of HARQ feedback signal misinterpretation; and
wherein the indication comprises the use of a different Radio Network Temporary Identity (RNTI) for MAC-PDUs requiring robust HARQ feedback transmission from the RNTI for MAC-PDUs not requiring robust HARQ feedback transmission.

19. The method of claim 18, wherein two RNTIs are signaled to the User Equipment (UE) utilizing a Radio Resource Control (RRC).

20. The method of claim 19, wherein one RNTI is signaled to the User Equipment (UE) utilizing a Radio Resource Control signaling and the UE takes a complement of the RNTI to use in determining the alternative RNTI.

* * * * *